United States Patent [19]
Brueckheimer et al.

[11] Patent Number: 6,023,465
[45] Date of Patent: Feb. 8, 2000

[54] COMMUNICATIONS SYSTEM

[75] Inventors: Simon Daniel Brueckheimer, London; Roy Harold Mauger, Herts; Allen William Oliver; Robert John Dean, both of Hert, all of United Kingdom

[73] Assignee: Northern Telecom Limited, Montreal, Canada

[21] Appl. No.: 08/809,208

[22] PCT Filed: Jun. 13, 1995

[86] PCT No.: PCT/GB95/01373

§ 371 Date: May 15, 1997

§ 102(e) Date: May 15, 1997

[87] PCT Pub. No.: WO95/35008

PCT Pub. Date: Dec. 21, 1995

[30] Foreign Application Priority Data

Jun. 14, 1994 [GB] United Kingdom .................... 9411894

[51] Int. Cl.[7] ........................................ H04Q 11/04
[52] U.S. Cl. .......................... 370/386; 370/395; 370/465
[58] Field of Search ........................... 370/352, 356, 370/359, 386, 389, 395, 398, 399, 412, 413, 419, 465, 466, 474, 400, 401, 402, 420, 467, 468

[56] References Cited

U.S. PATENT DOCUMENTS

| | | | |
|---|---|---|---|
| 4,922,487 | 5/1990 | Eilenberger et al. | 370/411 |
| 5,303,236 | 4/1994 | Kunimoto et al. | 370/398 |
| 5,327,421 | 7/1994 | Hiller et al. | 370/395 |
| 5,341,376 | 8/1994 | Yamashita | 370/466 |
| 5,513,174 | 4/1996 | Punj | 370/394 |
| 5,513,178 | 4/1996 | Tanaka | 370/359 |
| 5,521,915 | 5/1996 | Dleudonne et al. | 370/395 |
| 5,734,653 | 3/1998 | Hiraiwa et al. | 370/395 |

*Primary Examiner*—Ricky Q. Ngo
*Attorney, Agent, or Firm*—Lee, Mann, Smith, McWilliams, Sweeney & Ohlson

[57] ABSTRACT

A non-blocking broad band asynchronous transfer mode (ATM) switch having a plurality of ports is adapted to provide a switching function for narrow band traffic by means of adaptive virtual junctors attached to the switch ports to provide ingress to and egress from the switch and each having means for assembly and disassembly of ATM payloads. Each adaptive virtual junctor has a virtual connection with every other adaptive virtual junctor, each said virtual connection comprising a number of virtual circuits. Control means associated with each said adaptive virtual junctor determine on a call by call basis the number of virtual circuits on each virtual connection associated with that adaptive virtual junctor. A semi-permanent pool of capacity may be provided by transmission adaptation devices associated with the adaptive virtual junctors.

4 Claims, 8 Drawing Sheets

COMMUNICATIONS SYSTEM

CROSS REFERENCES TO RELATED APPLICATIONS

Attention is here directed to our co-pending applications Ser. No. 08/737,818 and Ser. No. 08/737,817 which relate to integrated broad band and narrow band access arrangements.

FIELD OF THE INVENTION

This invention relates to digital communications systems and in particular to systems embodying asynchronous transfer mode (ATM) technology.

BACKGROUND OF THE INVENTION

The asynchronous transfer mode (ATM) technology is a flexible form of transmission which allows any type of service traffic, voice, video or data, to be multiplexed together on to a common means of transmission. In order for this to be realised, the service traffic must first be adapted typically into 53 byte cells comprising 5 byte headers and 48 byte payloads such that the original traffic can be reconstituted at the far end of an ATM network. This form of adaptation is performed in the ATM adaptation layer (AAL). Five types of adaptation layer have been defined. This invention relates to adaptation layer 1 which is used to adapt constant bit rate traffic to the ATM standard.

BRIEF SUMMARY OF THE INVENTION

According to one aspect of the present invention there is provided n arrangement for adapting a non-blocking broad band asynchronous transfer mode (ATM) switch having a plurality of ports to provide a switching function for narrow band traffic, the arrangement including adaptive virtual junctors one attached to each said switch port to provide ingress to and egress from the switch and each having means for assembly and disassembly of ATM payloads, wherein each said adaptive virtual junctor has a virtual connection with every other adaptive virtual junctor, each said virtual connection comprising a number of virtual circuits, and means associated with each said adaptive virtual junctor for controlling on a call by call basis the number of virtual circuits on each virtual connection associated with that adaptive virtual junctor.

BRIEF DESCRIPTION OF THE DRAWINGS

Embodiments of the invention will now be described with reference to the accompanying drawings in which:-

DETAILED DESCRIPTION OF THE INVENTION

Figure 1:
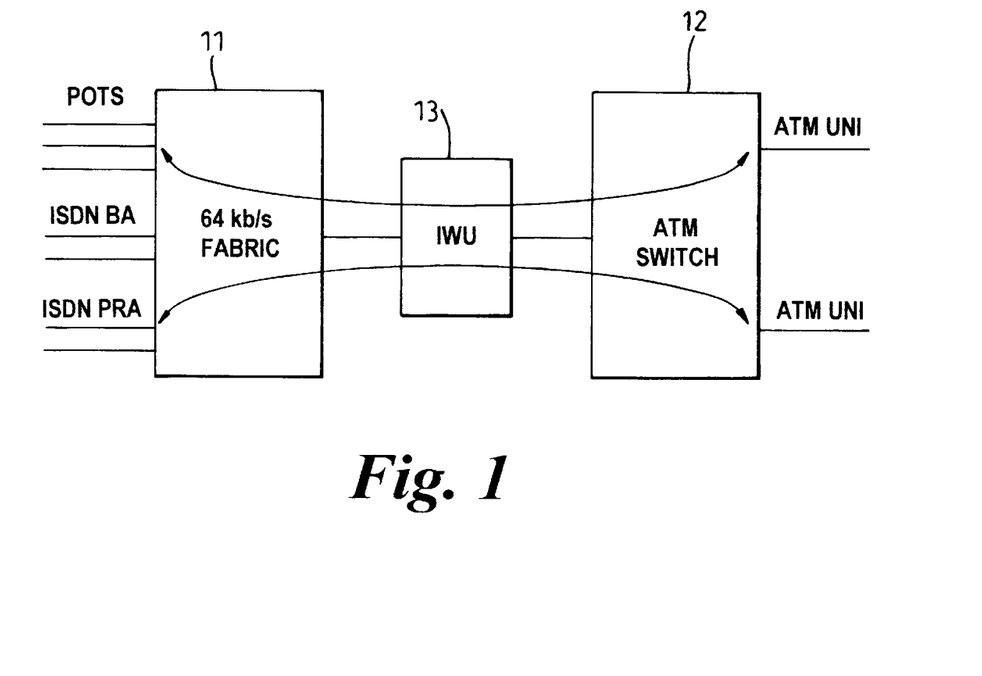
FIG. 1 is a schematic diagram illustrating the narrow band and broad band interworking requirements.

The basic requirements for an inter-working unit between a narrow band (11) and a broad band (12) public network switch via an interworking unit (13) are illustrated in FIG. 1. The interworking unit provides the adaptation function. The most basic form of inter-working is for voice applications in which a POTS line or an ISDN B-Channel must be adapted to a Virtual Circuit using ATM Adaptation Layer 1 providing 64 kb/s connectivity between the two networks; this is required to work with voice services on an ATM workstation. The cell assembly delay for such a connection is typically 6 milliseconds which can cause potential voice echo problems in many applications; echo cancellation to overcome such problems is well understood but is rather expensive to implement. The more general inter-working case is for a P×64 kb/s service typically used for H320 video conference where a value of P=6 is typical. Time slot sequence integrity is a special requirement of this application. The AAL1 can be used for unstructured data transfer in which a synchronous bit stream is passed transparently through an ATM network and reconstituted at the far end. For the flexible handling of 64 kb/s channels, the structured data transfer mode in which phase information identifying the start of an n×64 kb/s sub-frame is preferred as it allows 64 kb/s channels to be identified and manipulated.

Figure 2:
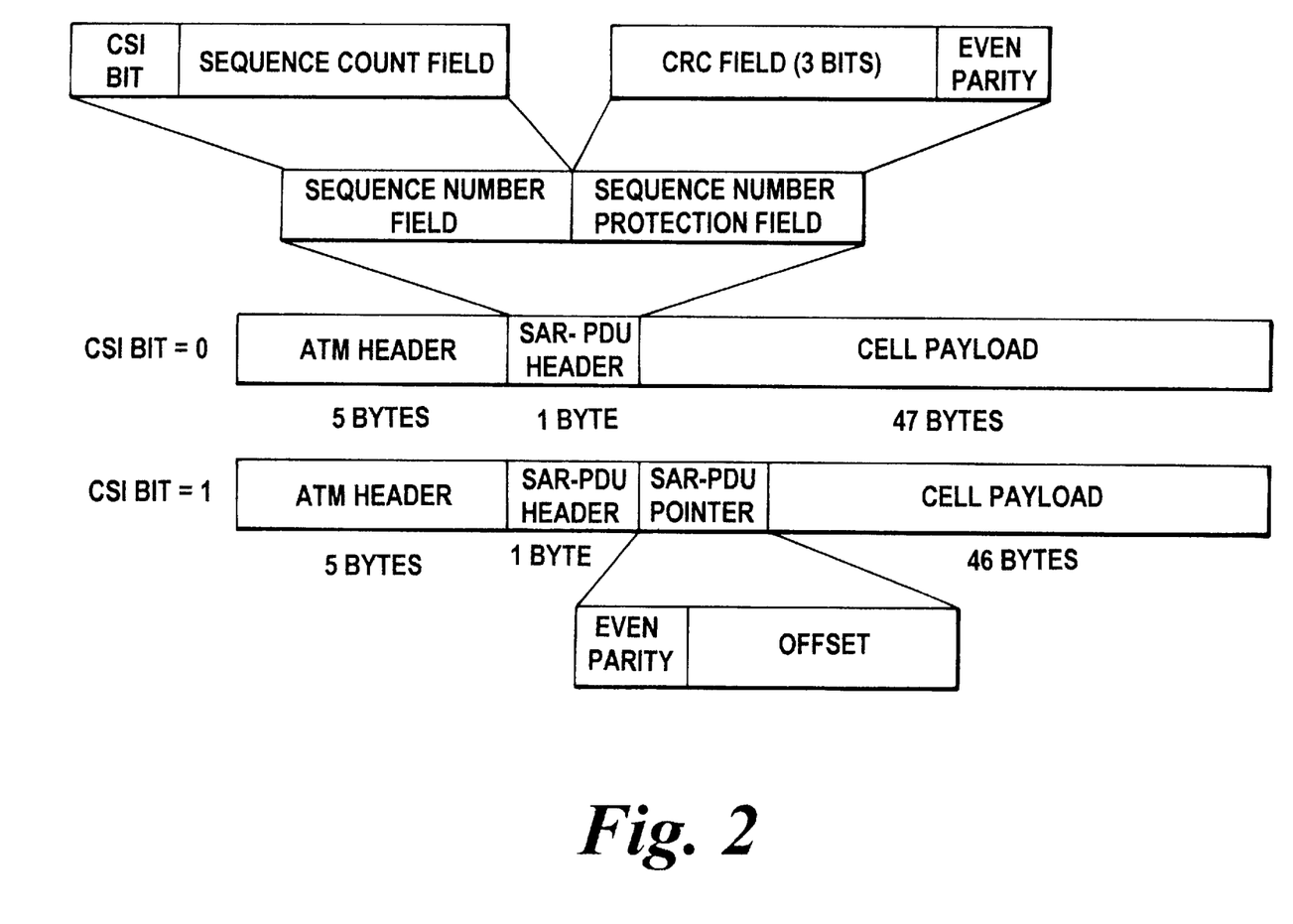
FIG. 2 illustrates the structure of the ATM adaptation layer 1.

The structured data transfer mode of AAL1 is illustrated in FIG. 2. The segmentation and reassembly process is controlled by a one byte header; this contains a sequence number so that lost and misrouted cells can be identified and compensated for. It further contains a sequence number protection field so that the segmentation and reassembly process is secure against bit errors. A CSI bit in the header is used in this instance to discriminate a further byte of payload to be used as a pointer to define the phase of the n×64 kb/s sub-frame within the payload.

Figure 3:
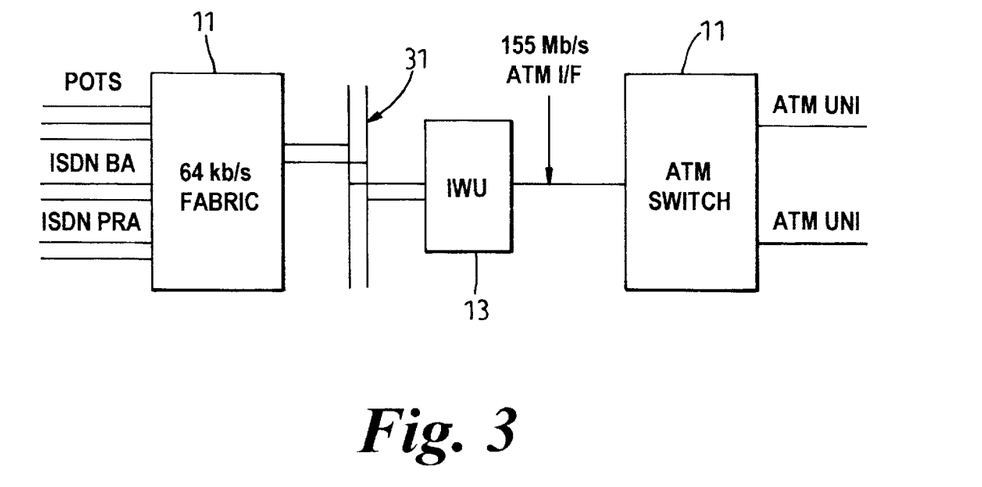
FIG. 3 illustrates flexible interworking unit functionality.

A bulk implementation of the inter-working function is illustrated in FIG. 3. A 64 kb/s switching fabric is typically implemented to work into a high capacity backplane bus 31. Lines and trunks work into same bus so as to separate the concerns of switching from circuit adaptation. The interworking device 13 provides adaptation for e.g. 2048 channels of backplane bus capacity into as many VCs as are required in order to fill a 155 Mb/s interface to an ATM switch. In the present example, this requires between 69 and 2048 Virtual Circuits depending on the number of 64 kb/s channels in each virtual circuit. The device may be structured to allow any channel on the backplane to be allocated to any time slot within any of the virtual circuits.

Figure 4:
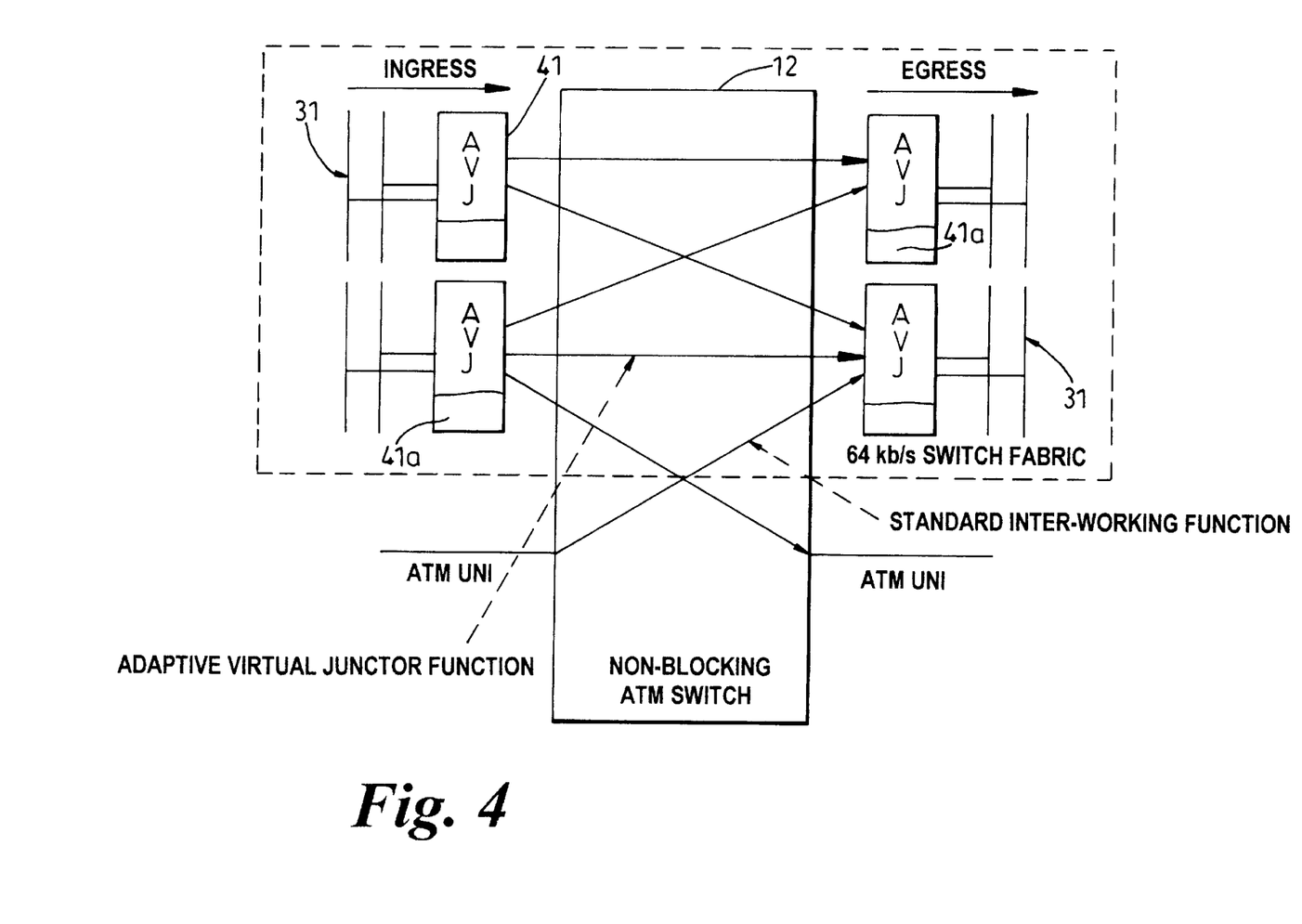
FIG. 4 illustrates the use of ATM as the basis for a narrow band switching fabric.

The interworking device used to adapt an ATM switch into a 64 kb/s fabric is termed an Adaptive Virtual Junctor (AVJ). As shown in FIG. 4, an AVJ 41 is attached to each port of the ATM switch 12 which is to be used as part of the 64 kb/s fabric. Each AVJ 41 has a junctor Virtual Circuit (VC) with each other AVJ. Each junctor VC is an n×64 kb/s connection in which n is allowed to vary e.g. between 6 and 2048; preferably 6 is set as a minimum so that the cell assembly delay of the fabric is never more than one millisecond avoiding all echo problems. A control element 41a is associated with each AVJ and all control elements use the ATM fabric to communicate control signals. The ATM switch is non-blocking, so that if a channel is available at an ingress AVJ and an egress AVJ it is also by definition available through the fabric.

When an ingress AVJ intends to change a VC from n×64 kb/s to (n+1)×64 kb/s; it first signals ahead to the control element of the egress AVJ to identify the channel and the connection requirements to the backplane. The change is then implemented in the ingress function and the change is signalled within the junctor VC, preserving frequency and phase across the junctor VC. The act of changing the capacity of the network of junctor VCs on a call-by-call basis, is exactly equivalent to the operation of a 64 kb/s switching fabric from the perspective of attached lines and trunks. As the mechanism is the extension of the standard inter-working function, it is still possible to use part of the ATM switch for broad band purposes and to provide narrow band and broad band inter-working.

Figure 5:
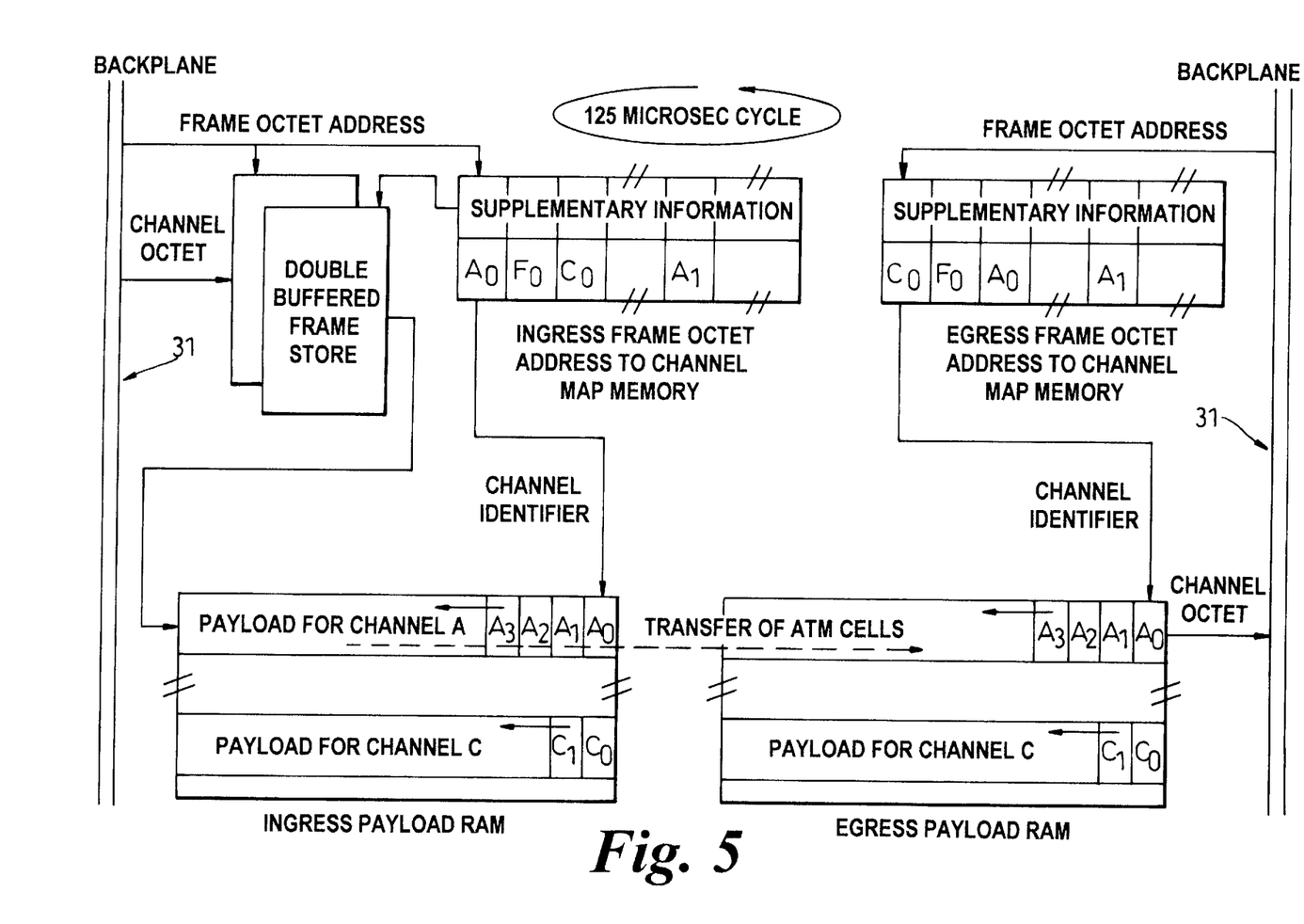
FIG. 5 is a schematic diagram of an adaptive virtual junctor.

The principle of operation of the adaptive virtual junctor is illustrated schematically in FIG. 5. The diagram shows the process of assembly and disassembly of ATM payloads, the process cycling e.g. every 125 microseconds. Both the ingress and egress processes use an octet address to channel map. This map relates a 64 kb/s channel octet to the payload of a virtual circuit. The address of the octet in the frame from the backplane is used to access the map which identifies the virtual circuit together with supplementary information. The ingress side uses a frame store whose order of loading and unloading may therefore differ. The ingress map contains an address into the frame store as part of the supplementary information such that the order in which the channel octets are concatenated into the payloads of virtual circuits may be freely chosen to match their time sequence ordering on the backplane of the egress process.

When complete, payloads are built into ATM cells using AAL1 structured data transfer as described below, and are despatched into the network. On receipt, the payloads are buffered and, under action of a similar map in the egress process, for any given channel octets are removed in the time slot sequence order of the frame. A control (not shown) maintains a record of the content of the maps to facilitate a simple reload of maps when an update is required.

Figure 6:
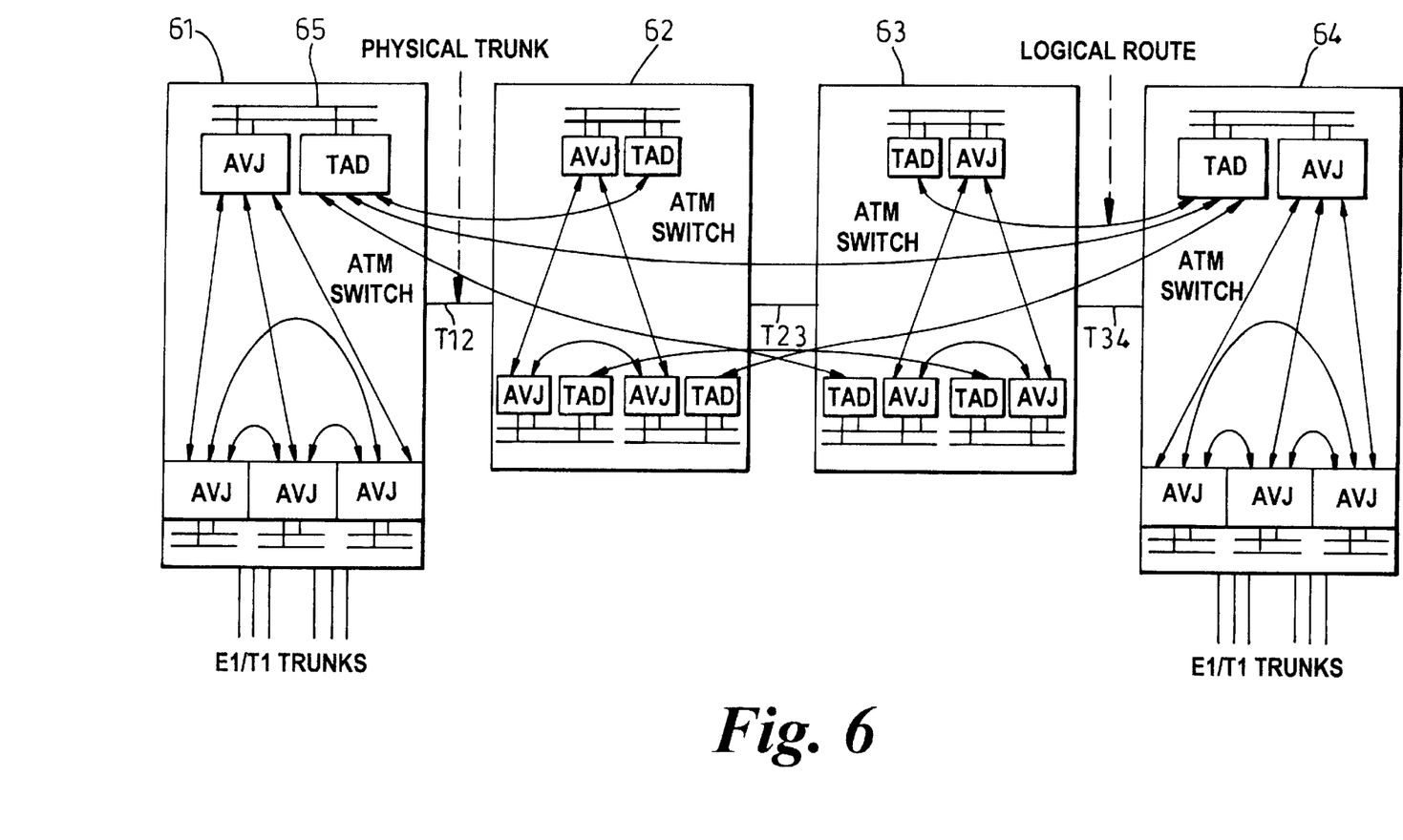
FIG. 6 illustrates the use of ATM transmission to link a number of ATM based narrow band switching fabrics.

Whereas a group of AVJs dynamically adapt the capacity of the junctor VCs, to adapt to the dynamic calling incidence of the 64 kb/s fabric, a Transmission Adaptation Device TAD may provide a semipermanent pool of capacity between two switches which can be used as required to establish calls between the two switches. Their respective roles are illustrated in FIG. 6. Four ATM switches (61 to 64) are shown in which the physical trunks (T12, T23, T34) between the exchanges are implemented purely in the ATM domain, e.g. STM-4, AU4c4. The capacity of these trunks is utilised to provide logical routes between destinations. A logical route comprises a number of VCs providing n×64 kb/s, where $6 \leq n \leq 30$ and in addition an associated B-ISUP signalling channel. The lower value of 6 is selected to avoid echo problems due to cell assembly delay; this means that a community of interest of at least six channels is required to justify a logical route. Changes to a logical route are achieved through Network Management action, and have a granularity of one 64 kb/s channel following initial establishment. Within each ATM switch, a network of AVJs maintains a 64 kb/s fabric function. The TADs are connected through the synchronous backplane 65 to the AVJs and have the ability to connect any backplane channel to any 64 kb/s time slot within any of the set of n×64 kb/s VCs forming a logical route.

As an example consider a network of eight 40 Gb/s ATM switches. Each switch uses 128×155 Mb/s ports as a 64 kb/s switching fabric providing 260,000 channel capacity per switch. Assuming 0.15 Erlangs/line, an 80% external traffic load requires 31,200 Erlangs/switch. This requires 16×155 Mb/s ports for logical trunk support. Assuming ring connectivity, then a capacity of 30,000 Erlangs is required in each ring connection, which can be achieved by two 2.5 Gb/s physical trunks between each section of the ring, also providing full protection against ring failure.

Figure 7:
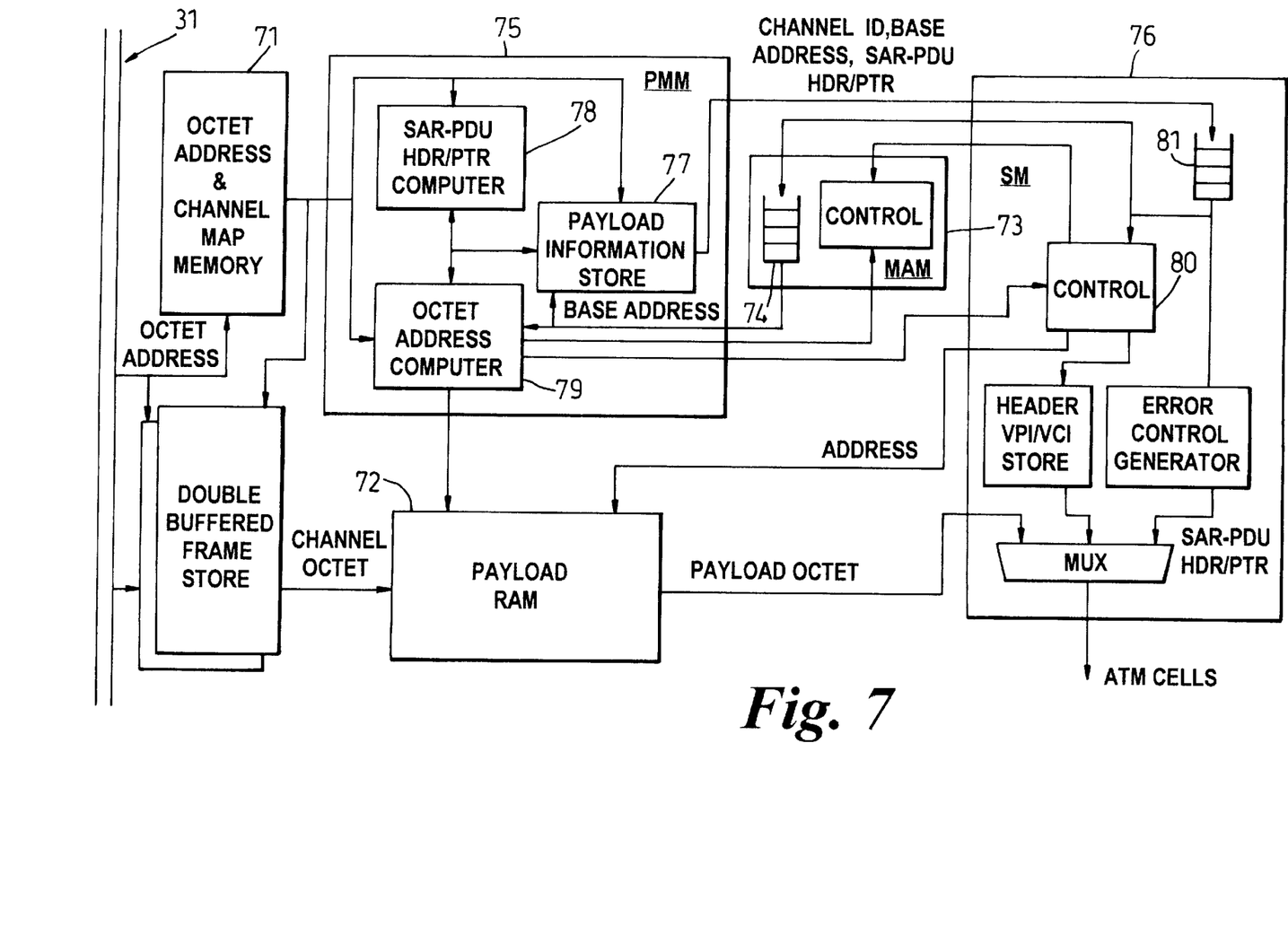
FIGS. 7 and 8 illustrate respectively interworking unit egress and ingress process architecture.
Figure 8:
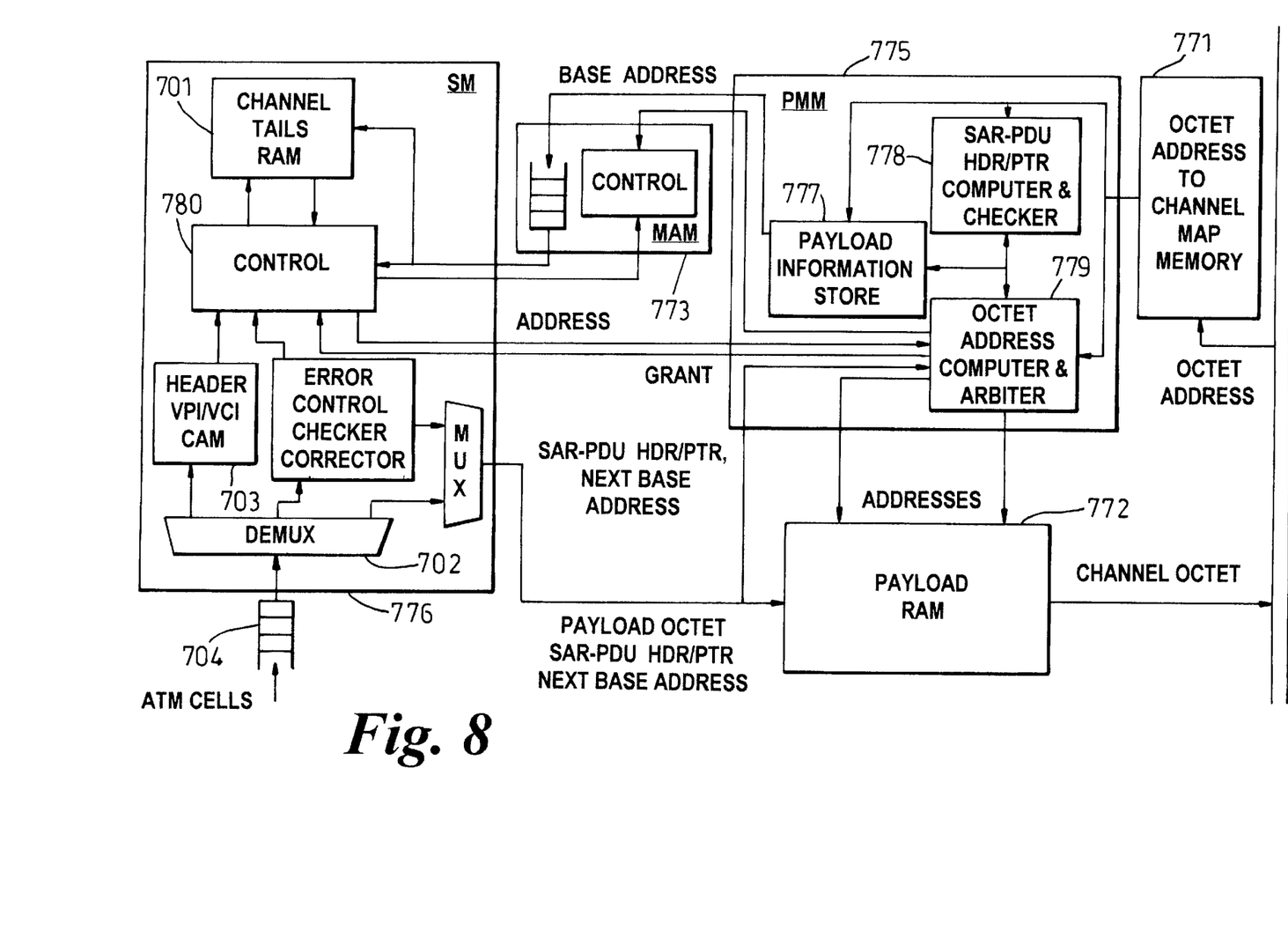

The generic function of the inter-working unit with regard to the assembly/disassembly of ATM cells is depicted in FIG. 7 for the egress process, and in FIG. 8 for the ingress process. The following paragraphs describe the function of each of the depicted modules.

The egress process (FIG. 7) accepts the octet address in the frame directly from the backplane bus 31 and applies it to a map memory 71, which stores an associated channel identifier, and supplementary information as discussed in detail in the sections on the Adaptive Virtual Junctor and Transmission Adaptation Device below. The contents of this map are primed and updated by an overall control process which has not been shown to ease clarity.

The main modules of the egress process are as follows.

Payload RAM 72 provides storage of cell payloads being assembled and awaiting dispatch. This needs to be a dual-port RAM, both to guarantee access for read and write process, and to allow asynchronous timing between the backplane and the ATM interface. The RAM 72 is sized so as to provide at least one extra buffer per channel to allow the simultaneous dispatch of an assembled cell and the assembly of the next. For m=2048, worst case 4096 payloads must be provided for. However, only payload information needs to be stored and each slot must be at least sufficient for 48 octets. The Memory Allocation Module (MAM) 73 provides a means to efficiently distribute the buffer of the payload RAM among an arbitrary configuration of n per channel, for arbitrary m channels. A FIFO store 74 is primed with all the base addresses that the initially empty payload RAM may hold; worst case it would need to be 4096 locations deep. Payload base addresses are requested by the Payload Management Module (PMM) 75 and popped from the top of the FIFO 74. Freed base addresses are returned from the Scheduler Module 76 and pushed on the end of the FIFO 74. The FIFO cannot underflow as long as the bandwidth from the backplane does not exceed the payload bandwidth of the ATM interface.

The Payload Management Module (PMM) 75 is tasked with the simultaneous assembly of the payloads of arbitrary m channels. The Payload Information Store 77 is a RAM that is addressed by the channel identifier, and therefore has m locations that contain the following:-

Address The payload base address of the currently assembled payload in the Payload RAM. In the TAD application, a sub-frame is used to reserve n×64 kb/s bandwidth for a community-of-interest, which depending on n, may overlap cell payload boundaries. Hence the payload base address of the next cell will also be stored. In the AVJ the channel octets are strictly in time slot sequence, in which case only one entry is used. Independent of n, the payload of the current cell will always be completed first, as n<30 guarantees that the subframe can not overlap more than two cells.

Max Fill The maximum level to which the payload of cells for this channel should be filled If other than the default of 47. This enables the dispatch of cells earlier than usual to reduce the latency, and would therefore also be needed to determine which payload, current or next, when performing sub-frame assembly in the TAD application. The maximum fill would be part of the supplementary information for the channel in the octet address to channel map.

Fill A count of the number of bytes written so far into the current and possible next payload. This is used to calculate when the current payload is complete. This is also used as a basis for determining the position of the sub-frame in the payload.

Fill Incr. The size of the sub-frame, if any, for this channel in the number of octets, default is one. The fill increment is also stored as a decrementing count so that it provides a prediction for the need for the inclusion for and value of the SAR-PDU pointer.

Sequence The SAR-PDU Sequence Number for the current cell, even if more than one cell is being assembled (TAD application). When the current cell payload is fully assembled, the next cell SAR-PDU sequence number may be easily calculated and updated from it, as can the CSI bit indicating the possible inclusion of a SAR-PDU pointer.

Pointer The SAR-PDU pointer, as discussed above for the SARPDU Sequence Number. Only one pointer need be stored at any one time, as the ITU standard includes a pointer only on cells with an even sequence number, and at most once in a sequence of eight cells on a channel. The high order bit of the pointer can be used to store an indication of whether a pointer has been sent in this sequence cycle, as the parity is generated later in the SM.

The PMM receives a channel identifier, and depending on the application, an offset in the sub-frame, a fill increment, and maximum fill level from the Octet Address to Channel Map, for each channel octet.

The SAR-PDU Header/Pointer Computer 78 determines, using the channel identifier, the stored sequence number and pointer for the channel, which after computation may be updated under action from the Octet Address Computer 79 described below. The sequence number is an increment by one of the previously stored value. The computation of the CSI bit, i.e indication of the inclusion of the pointer, depends on the sequence number; it must be even, and if there has been no prior indication this sequence the seventh must include a pointer. The value of the pointer used depends on whether the next frame boundary will lie within the next 93 octets. This is calculated on the stored fill level, the sub-frame offset, and the decremented fill increment.

The Octet Address Computer 79 determines using the channel identifier the stored assembly information for the channel. It uses the fill level, fill increment and sub-frame offset to determine whether the octet begins a new payload, in which case it requests a payload base address from the MAM 73. The actual octet address in the Payload RAM 72 is computed from the sub-frame offset, the fill level, and the relevant payload base address (there may be two cells assembled simultaneously in the TAD application). If the present cell has become full, then the channel identifier, payload base address and SAR-PDU header and pointer are transferred to the SM 76. New values are calculated and returned to the Payload Information Store 77; if a payload has just been completed, and a new one begun, any next payload base address is made the current payload base address, and the SAR-PDU header and pointer updated.

The Scheduler Module's (SM) task is to generate and dispatch cells on the ATM interface. Each time the PMM 75 assembles a full payload, it signals the controller 80 in the SM, and transfers the channel identifier, payload base address, and the SAR-PDU header (and pointer if applicable) associated with it. The SM pushes this information on the end of an initially empty FIFO (81) queue; therefore all cells are dispatched in turn, no channel need have higher priority than any other in these applications.

The controller pops an entry from the top of the FIFO 81 whilst it is not empty. The channel identifier is used to access a header table that stores the ATM cell header associated with the channel, and multiplexes this on to the ATM interface. The SAR-PDU header (and pointer if applicable) from the FIFO, are fed via an error control generator that adds the AALI error protection coding as per the ITU standard, and also multiplexes these on to the ATM cell stream. The control then completes the cell by reading the assembled payload sequentially from the payload RAM by using the payload base address from the FIFO.

When the cell has been sent, the payload base address is fed back to the MAM 73 as it is now free for reuse. The header table RAM is primed and updated.

The ingress process, (FIG. 7) which is directly analogous to the egress process, accepts the octet address in the frame directly from the backplane 31 and applies it to a map RAM 771, primed and updated by the same overall control process. ATM cells are decoupled by a small FIFO to allow asynchronous operation from the ATM interface.

The Payload RAM 772 is used effectively to provide a variable sized FIFO per VC. The paradigm of a FIFO is the provision of a queue facility, with indication of the head and tail of the queue. The Payload RAM is arranged to behave as a distributed FIFO by organising the payloads it contains for any VC as a linked list. The head of this list or queue is effectively the stored payload base address in the Payload Information Store 777 of the Payload Management Module (PMM) 775. The tails of all the per VC queues are stored in a special Channel Tails RAM 701 in the Segregation Module 776, addressed by the channel identifier. The next pointers of the linked list are stored in the Payload RAM. Further detail of this operation is described below.

This is as per the egress process, other than that SAR-PDU header and possible pointer and a next payload pointer base address are stored along with each received payload user information.

This is also as per the egress process, other than the interval between payload base addresses must allow for the additional space for the next payload pointer. The MAM 773 provides payload base addresses to the Segregation Module (SM) 776, and receives freed payload base addresses from the Payload Management Module (PMM) 775, the process having been reversed with reference to the egress process.

The MAM can be designed to indicate to the Payload Management Module (PMM) when more than a predetermined number of payloads have been utilised. This allows an aggregate fill level to be achieved to compensate for statistical jitter caused by the ATM network.

The Segregation Module (SM) handles the incoming ATM cells. A demultiplexer 702 strips the ATM cell header from the payload. A header recognition function is implemented by a Content Addressable Memory (CAM) 703, as the VPINCI address space will be sparsely populated. The CAM is used to determine the associated channel identifier.

The demultiplexer is also used to direct the SAR-PDU header and possible pointer to a block performing the necessary error detection and correction of the ITU AALI standard. The possibly corrected SARPDU headers and pointers can be multiplexed back into the stream to be stored along with the user information in the payload in the Payload RAM. Certain errors may cause the cell to be discarded, in which case the PMM will perform the same error recovery as if the cell had been lost in transit, detected from the SAR-PDU sequence number.

The controller 780 uses the channel identifier from the Header Recognition block to determine the last payload base address from the Channel Tails RAM 701. A new payload base address is requested from the MAM and stored in the next pointer of the last payload. The new base address is written back to the Channel Tails RAM. If the queue for that channel is empty, then the controller 780 signals the PMM the payload address to form the head of the queue. The controller sets the next pointer of the current cell is set to point to itself, to indicate the end of queue. Thereafter the controller stores the SARPDU header and possible pointer and the user payload in the Payload RAM.

The controller does not have guaranteed access to the payload RAM, arbitrated by the PMM, which needs occasional use of the port. Whilst one port of the payload RAM is dedicated for retrieval of the octet data for the backplane process, the other port is unused during the interval of the receipt of ATM cell headers. Since the ATM cell header is segregated, there are five octet time periods available per payload, allowing the SAR-PDU header, pointer and next payload pointer to be stored and retrieved from the Segregation Module's port. If access is denied to the SM, the input FIFO 704 provides a means for freewheeling until access is again granted.

The Payload Management Module (PMM) 775 is tasked with the simultaneous disassembly of the payloads of arbitrary m channels. The Payload Information Store 777 is identical to that of the Egress PMM. Moreover the Ingress PMM receives identical information from the Ingress Octet Address to Channel Map to that of the egress process.

The SAR-PDU Header/Pointer Computer 778 determines the stored sequence number and possible pointer for the channel, in an identical manner to the egress process. The sequence number is compared with that stored in the payload RAM 772 to ensure that is an increment by one of the previously stored value. The computation, hence prediction, and check of the CSI bit, and pointer are performed in a similar manner. Any discrepancies in sequence number indicate lost or misrouted cells, and suitable error recovery may be applied, such as the interpolation of default values, as per the ITU standard. An attempt is made to correlate discrepancies in the pointer value with the rate change mechanism described later, otherwise suitable framing recovery measures can be taken.

The Octet Address Computer 779 again uses the channel identifier from the map, to determine the stored assembly information for the channel. It determines as per the egress process if the octet begins a new payload, but in this case it retrieves the payload base address from the next pointer of the current payload in the Payload RAM, transferring the SAR-PDU header and pointer at the same time. Access is denied to the Segregation Module during this operation, otherwise the address on this port is that presented by the latter module controller. If there is no next payload, suitable error recovery must be applied to interpolate octets. The frame's octet address from the backplane is used to access the map, and thereby identify the channel to which the octet at that address in the frame belongs.

The payloads are therefore assembled for any given channel, in the time slot sequence order of those channel's octets in the frame. When complete, the payload are built into ATM cells as described earlier and dispatched into the network. On receipt, the payloads are buffered, and under action of the same map, octets are removed on demand for any given channel, again in the time slot sequence order of the channel's octets in the frame.

Figure 9:
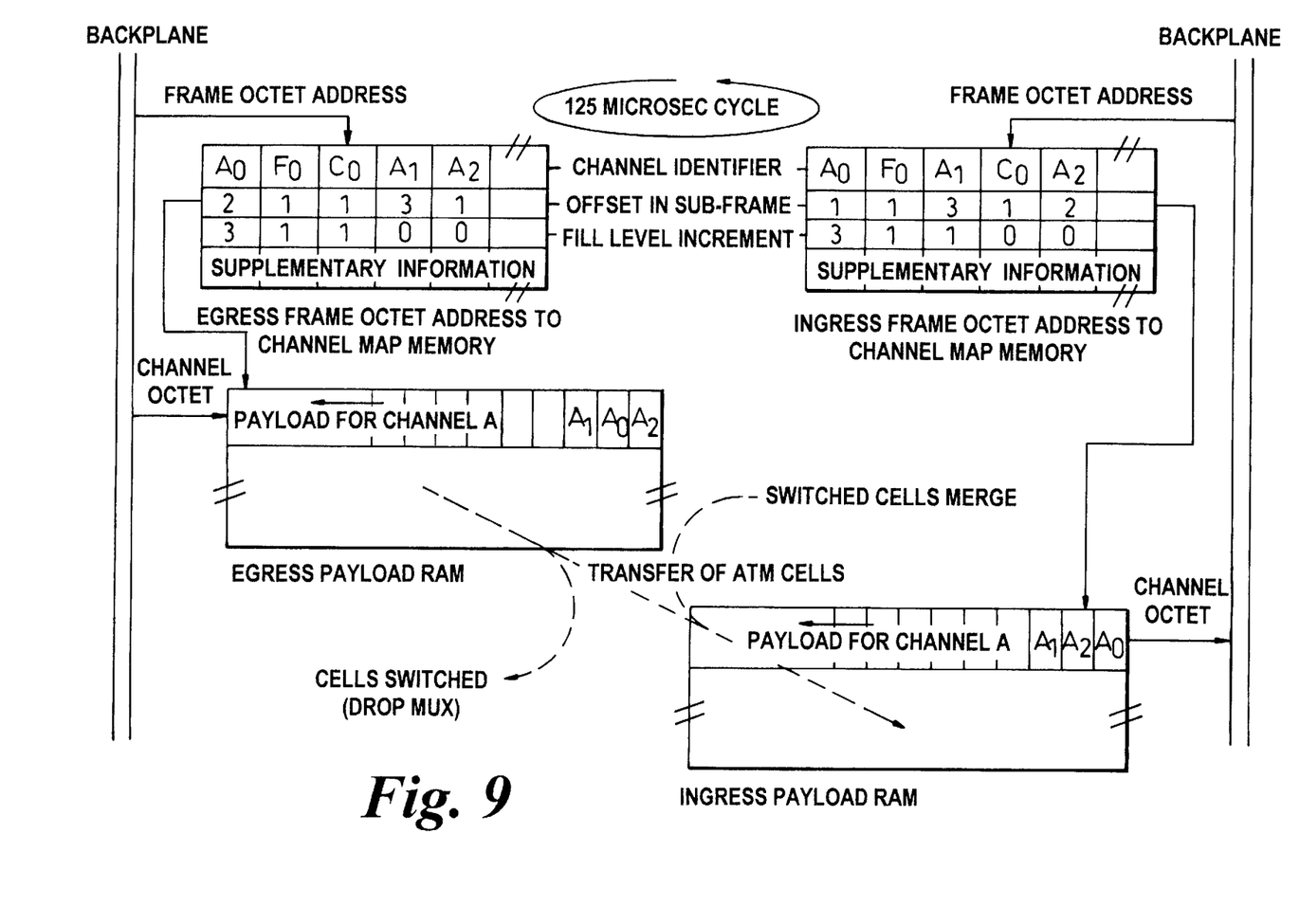
FIG. 9 is a schematic diagram of a transmission adaptation device.

The process of the Transmission Adaptation Device (TAD) is illustrated in FIG. 9. This is similar to the operation of the AVJ described above, other than the channel's octets are free to be permuted in order both on assembly and disassembly of the payloads of the corresponding VC. The permutation can only occur within bounds of a notional sub-frame, whose length correspond to the number of octets for the given channel in a single frame (i.e. n×64 kb/s in the 1251ls cycle). In the map, the first occurrence of each channel identifier indicates a fill increment, which is literally the length of the sub-frame. Paired with each channel identifier is an offset, which indicates the position in the sub-frame in the payload being assembled. After each 1251ls cycle, the start of the sub-frame is implicitly moved on by the fill increment for each channel.

The ingress process has the identical function. However, the map may be freely chosen to change the order in which octets are removed from the sub-frame of any channel, and additionally the sequence in which channels are accessed. In this manner a time slot interchange function may be implemented.

The time slots may be interchanged arbitrarily on the egress or the ingress side. One of several VCs may be used and time slots may be interchanged between VCs.

For the community-of-interest application, the means of detecting a change of rate of n to n+1 is referred to as the rate adaptation process and is implemented as follows. The rate can only be changed at a frame boundary with respect to the backplane. The change of rate in the community of interest is signalled on an AAL5 channel ahead of time, and there remains the means to detect that rate change in-band. This is achieved by correlating the anticipated change with a SAR-PDU pointer violation, which will be out by one position. However, a reliable means to distinguish the rate change pointer violation from other pointer errors is necessary, as is the means to control the possible error extension, should the particular cell containing the pointer be lost or errored.

Referring back to FIG. 2 it will be noted that a Sequence Number Protection Field is depicted. This consists of a 3-bit cyclic redundancy code (CRC) and an even parity bit. The ITU standard specifies that the normal state is to perform error correction. This may be achieved using the syndrome of the CRC. However, when in this mode, all non-zero syndromes have to be assumed to be single bit errors. Consequently, other odd numbers of errors in this field may be detected by the parity bit being violated. However, these burst errors are far less likely than single bit errors in terms of their probability of occurrence. This error detection is exploited by alternating the parity on the SARPDU Sequence Number each time that there is a rate change required. At the ingress process, a valid CRC and pointer can be used to correlate the sign of the parity bit. Normally, a valid CRC, and a violation of the parity correlated with a pointer violation can be taken to imply the change of rate. A parity violation on its own would imply an error. Error extension due to the loss of the pointer cell can be limited to that cell, since all subsequent cells contain a sequence number with parity inverted, and therefore are far more likely to indicate the rate change rather than error, in the absence of CRC errors.

We claim:

1. An arrangement for adapting a non-blocking broad band asynchronous transfer mode (ATM) switch having a plurality of ports to provide a switching function for narrow band synchronous traffic carried in time slots within frames on a backplane bus, the arrangement including adaptive virtual junctors coupled to the backplane bus and each attached to a respective said switch port to provide ingress to and egress from the ATM switch so as to provide an interworking function for the narrow band traffic between the backplane bus and the switch and to provide a separation of switching and circuit adaptation of that traffic, each said virtual junctor having a control means associated therewith and each having means for assembly and disassembly of ATM payloads, and transmission adaptation devices arranged to provide a semi-permanent pool of capacity for the establishment of narrow band calls via logical routes comprising a set of narrow band virtual channels between said switch and one or more remote switches, said transmission adaptation devices being coupled to the adaptive virtual junctors via said backplane and being arranged to connect any backplane channel to any narrow band time slot within any of the set of virtual channels forming a said logical route, wherein each said adaptive virtual junctor has a permanent virtual connection via the ATM switch with every other adaptive virtual junctor coupled to that switch, each said virtual connection comprising a number of virtual circuits, and means associated with each said adaptive virtual junctor for controlling on a call by call basis and at a backplane frame boundary the number of narrow band virtual circuits on each virtual connection associated with that adaptive virtual junctor.

2. An arrangement as claimed in claim 1, wherein each said ingress adaptive virtual junctor has means for signalling to a respective egress adaptive virtual junctor information identifying a change in the number of virtual circuits on the virtual connection therebetween.

3. An arrangement as claimed in claim 2, wherein each said egress adaptive virtual junctor includes means for assembling ATM cell payloads and for generating corresponding channel identifiers, a memory for storing said cell payloads, and a scheduler for providing each stored ATM cell with a header corresponding to the channel identifier and for queuing the headed cell for dispatch.

4. An arrangement as claimed in claim 2, wherein each said ingress adaptive virtual junctor includes means for removing headers from incoming ATM cells, a memory for storing the payloads of the received cells, and means associated with said mapping means for allocating frame addresses to said payloads.

* * * * *